United States Patent
Xu (10) Patent No.: US 11,635,561 B2
(45) Date of Patent: Apr. 25, 2023

(54) LASER BACKLIGHT FOR NARROW-FRAME EDGE-LIT TYPE LIQUID CRYSTAL DISPLAY

(71) Applicant: Jiangke Xu, Beijing (CN)

(72) Inventor: Jiangke Xu, Beijing (CN)

( * ) Notice: Subject to any disclaimer, the term of this patent is extended or adjusted under 35 U.S.C. 154(b) by 0 days.

(21) Appl. No.: 17/493,798

(22) Filed: Oct. 4, 2021

(65) Prior Publication Data
US 2022/0099878 A1  Mar. 31, 2022

Related U.S. Application Data (63) Continuation of application No. PCT/CN2020/000056, filed on Mar. 27, 2020.

(30) Foreign Application Priority Data

Apr. 4, 2019 (CN) .......................... 201910273005.4
Apr. 4, 2019 (CN) .......................... 201920455275.2

(51) Int. Cl.
*F21V 8/00* (2006.01)

(52) U.S. Cl.
CPC .......... *G02B 6/0031* (2013.01); *G02B 6/0051* (2013.01)

(58) Field of Classification Search
CPC .. G02B 6/0051; G02B 6/0043; G02B 6/0031; G02B 27/09
See application file for complete search history.

(56) References Cited

FOREIGN PATENT DOCUMENTS

| CN | 104049445 A | 9/2014 |
| CN | 205608346 U | 9/2016 |
| CN | 212540968 U * | 2/2021 |
| CN | 213069413 U * | 4/2021 |

OTHER PUBLICATIONS

International Search Report and Search Opinion on PCT/CN2020/000056 (parent of the present application)—English translation.

* cited by examiner

*Primary Examiner* — Karabi Guharay
(74) *Attorney, Agent, or Firm* — Yong Chen (57) ABSTRACT

Laser backlight source for a narrow-frame edge-lit type liquid crystal display. The laser backlight includes visible laser groups, beam shaping devices, reflectors and a liquid crystal display light guide plate. After being reflected by reflectors to change a laser propagation direction by 180 degrees, laser beams emitted by visible lasers are incident on the liquid crystal display light guide plate through a light-permeable surface. When being incident on the lateral light-permeable surface of the liquid crystal display light guide plate via the reflectors, the visible laser beams emitted by adjacent visible laser groups generate light overlap larger than 10% of the area of each light spot. A sum of lengths of laser spots of the visible laser groups at a same waveband on the lateral light-permeable surface of the liquid crystal display light guide plate is greater than or equal to 0.65 times of the length of the light-permeable surface.

10 Claims, 5 Drawing Sheets

LASER BACKLIGHT FOR NARROW-FRAME EDGE-LIT TYPE LIQUID CRYSTAL DISPLAY

FIELD

The present disclosure relates to a laser light source for a liquid crystal display, in particular to a laser backlight structure for an edge-lit type liquid crystal display.

BACKGROUND

The optical system for current liquid crystal displays is designed for surface light sources based on LEDs as the light-emitting components, and has been very mature.

Advantages of the LED light source are as follows:

the spatial divergence angle of light is about 150 degrees without axial difference, and energy of light is approximately uniform;

the shape and size of the light-emitting region of an LED can be changed by semiconductor processing process;

forming a white light as display light source based on LEDs is simple, and the white light formed is uniform;

LED light source has low requirements for cooling, and a heat sink for cooling is small in size, light in weight and simple in structure; and the spectral width of LED devices is broad, and effect of wavelength with increasing temperature on color is negligible.

The above advantages allow a surface-mounted lamp bead type narrow-band surface light source composed of a huge quantity of low-power light-emitting spots can be made from LEDs.

Such LED surface light source emits single-spot light with uniform energy distribution and low optical power, and a huge quantity of LED light-emitting spots can be arranged in arrays in a length direction to form a uniform surface light source with very high total light intensity. A width of a light-emitting region of a separate LED lamp bead of the surface light source can be made to be less than the width of an edge-lit light-permeable surface of a light guide plate, and the light guide plate is high in optical coupling efficiency; and a thickness being 3 mm facilitates cooling and mounting, and a length can be optionally cut, so that the light guide plate is widely applied to a backlight for an edge-lit type liquid crystal display.

For a backlight for an edge-lit type liquid crystal display, a surface-mounted lamp bead type narrow-band surface light source with a huge quantity of low-power light-emitting spots is mounted on a side surface (length×thickness or width×thickness) of a PMMA light guide plate, and low-brightness and uniform light emitted by LED lamp beads is totally reflected after being incident on the light guide plate. Several scattering regions present on a surface (length× width) of the light guide plate are used to damage total reflection of light in the light guide plate, so that a surface light source is formed on an emergent surface of the light guide plate (length×width). For example, 176 white LED lamp beads with 7 mm×2 mm light-emitting surfaces are used on a side surface of a light guide plate of a 70-inch liquid crystal display television, each lamp bead has 2 LED light-emitting spots, and the 352 white LED light-emitting spots are used to ensure that LED white light can form a larger-area and uniform liquid crystal display backlight after entering the light guide plate.

A liquid crystal display with LEDs as a light source can only meet requirements of 2K-resolution liquid crystal displays. A color domain coverage ratio, color saturation, color rendition degree and number of colors required by 4K and 8K liquid crystal displays are far from standards.

Laser display is a novel display technology, and a laser light source, as the best display light source that people can obtain, can meet related standards and requirements for 4K and 8K displays. Compared with conventional display light sources such as LED, OLED, quantum dot and cold-cathode lamp, the laser light source has the advantages of highest monochromaticity, least spectrum width and smallest beam divergence angle, so that the semiconductor laser light source has been widely applied as a light source for projection display equipment.

However, the laser light source to be used as a light source for an edge-lit type liquid crystal display still faces the following problems.

1. Due to large size, low efficiency, extremely high cost and complex structure, an all-solid-state laser cannot be used as a light source for a flat liquid crystal display.

2. Only a semiconductor laser can be used as a laser light source for a liquid crystal display at present.

3. Commercial visible semiconductor lasers are all end emission lasers.

Compared with an LED, an end emission visible laser has an absolute advantage in color aspect but has the following obvious defects in other application aspects:

due to a large packaging volume (about 10 times or above that of an LED with same light-emitting power) and a complex packaging structure, surface-mounted packaging cannot be implemented;

because the end emission visible laser is limited in packaging modes, the distance between light-emitting spots of the end emission visible laser is 10 times or more than that of an LED. Due to a too large light-emitting gap, no-color-difference white light and a uniform-brightness surface light source cannot be formed;

Electro-optical conversion efficiency is low (about 50% to 30% of that of an LED with same light-emitting power);

a laser wavelength is sensitive to temperature variation, red shift of wavelength easily occurs as temperature rises, and a requirement for cooling is several times higher than that of an LED;

a light source for the end emission visible laser needs to be forcibly cooled, otherwise thermal attenuation of output power is caused after long-term use, which further affects a service life;

a power density of a light-emitting region of the end emission visible laser is tens of times over that of an LED;

the laser is high in monochromaticity, and when the laser is used as a light source for a display, three-primary-color laser light sources need to be used for white light synthesis;

the laser has problems of image speckles and noise interference;

a light-emitting region of a visible end emission semiconductor laser is only 100 μm wide and has an extremely high power density, resulting in damage to a plastic light guide plate; and most importantly, laser beams emitted by the visible end emission semiconductor laser have an anisotropic divergence angle, a fast-axis divergence angle is about 40 degrees, a slow-axis divergence angle is less than 10 degrees, and light spots are oval-shaped, which cannot be changed by a semiconductor processing process.

At present, there have been many related patents in which visible end emission semiconductor laser light sources are applied to liquid crystal displays. These patents refer to, without exception, an existing solution for the preparation of an edge-lit type LED surface light source, in which lasers are disposed on a side surface of a light guide plate. For example, the patent CN104344284A and the patent CN104180244A disclose "LASER BACKLIGHT DEVICE". With this device, red, green and blue three-primary-color laser beams are combined and synthesized by a lens to form white light first and then the white light is incident on a light guide plate module, where the combined white light is extremely small in divergence angle. After entering the light guide plate module, laser beams are expanded by scattering particles doped in the light guide plate module, to form a laser surface light source high in brightness and uniform in light distribution. The patent CN104180244A discloses "LASER BACKLIGHT DEVICE". A light guide tube is disposed at the periphery of a light guide plate, light-permeable holes are reserved in the light guide tube, scattering bodies are present in the light guide tube, laser beams are subjected to diffuse reflection by the scattering bodies in the light guide tube when passing through the light guide tube, to generate scattered white laser beams, and the scattered white laser beams enter the light guide plate, to form a surface light source. In these two solutions, scattered laser beams scattered by nanoparticles are used as a backlight for a display, and are scattered by the nanoparticles to form spatial 360-degree illumination light the same as light from a cold-cathode lamp (fluorescent lamp). When used as a display backlight, such scattered light is spatially emitted by 360 degrees and will be lost by 25% to 40%, and finally a light incidence rate (coupling efficiency) of the light guide plate is about 60% to 75%. For the cold-cathode lamp (fluorescent lamp) low in price, relatively low in power consumption and relatively small in heat dissipation, a relatively low light incidence rate of the light guide plate is not a problem. However, for a laser expensive in price, very high in power consumption and large in heat dissipation, 25% to 40% of light loss generated during incidence and light guide is not acceptable, because too high light incidence loss of the light guide plate means that a display will use more lasers, which greatly increases costs and power consumption of a laser liquid crystal display. What is important is that with this solution, a frame width of a liquid crystal display is too great, resulting in an unattractive appearance of the whole liquid crystal display. In addition, a mechanical mounting structure of a light source structure is easily incompatible with a mechanical mounting structure of a liquid crystal display and other devices. Most importantly, this solution only solves a white light synthesis problem, but not yet solves a shimming problem, resulting in non-uniform brightness distribution of the display.

The Chinese patent application 201520476596.2 discloses a surface light source structure for laser display. In this solution, a plurality of light-bar-shaped red, green and blue three-color lasers are arrayed on four side surfaces of a light guide plate. Three-color laser light directly enters the light guide plate, the lasers are spaced too far, and red, green and blue three-color laser light is not uniform in strength distribution, so that white light cannot be synthesized, resulting in grainy screen and non-uniform screen brightness (FIG. 1), and normal use requirements for liquid crystal display cannot be met. However, for a large-size liquid crystal display, higher brightness is needed to support image quality. When this patent solution is used for actual technical implementation, the backlight requirement of a large-screen liquid crystal display can only be met with 600 lasers or more. As such, costs and heating power consumption of the laser liquid crystal display are increased exponentially.

These existing patent solutions cannot solve actual problems of image speckles, color bands, non-uniform brightness distribution of the light field, and low brightness caused when the visible end emission semiconductor laser is not matched with an existing edge-lit type LED liquid crystal display optical system.

The existing edge-lit type LED liquid crystal display backlight optical system cannot be matched with an end emission laser light source.

In order to apply the end emission semiconductor laser light source to the edge-lit type liquid crystal display and realize commercialization, the novel edge-lit type liquid crystal display backlight structure suitable for optical parameters and a structure of a visible end emission semiconductor laser needs to be developed.

Summary

In view of above, the present invention provides a laser backlight for a narrow-frame edge-lit type liquid crystal display. The backlight can eliminate speckles, color blocks, bright and dark stripes and non-uniform color temperature caused when visible laser beams at different wavebands are not overlapped in a light guide plate of a liquid crystal display, so as to obtain a light field which is distributed uniformly.

A laser backlight for a narrow-frame edge-lit type liquid crystal display includes an end emission visible laser groups, beam shaping devices, reflectors and a liquid crystal display light guide plate.

The end emission visible laser groups are mounted on a back surface of a liquid crystal display housing, a front surface of the liquid crystal display housing is attached to the liquid crystal display light guide plate, the end emission visible laser groups have a specific optical length away from a lateral light-permeable surface of the liquid crystal display light guide plate, and after being reflected by the reflectors to change a laser propagation direction by 180 degrees, laser beams emitted by visible lasers are incident on the liquid crystal display light guide plate through the light-permeable surface; when being incident on the lateral light-permeable surface of the liquid crystal display light guide plate via the reflectors, the visible laser beams emitted by the adjacent end emission visible laser groups generate a light overlap larger than 10% of an area of each light spot, and a sum of lengths of laser spots of the end emission visible laser groups at a same waveband on the lateral light-permeable surface of the liquid crystal display light guide plate is greater than or equal to 0.65 times of the length of the light-permeable surface; the beam shaping devices are present between the end emission visible laser groups and the reflectors and between the reflectors and the lateral light-permeable surface of the liquid crystal display light guide plate; and the beam shaping devices adjust a divergence angle of the visible laser beams.

Further, an optical length L between an optical axis of the end emission visible laser groups and a corresponding incident surface of the liquid crystal display light guide plate and a divergence angle $\theta_y$ of the laser beams emitted by the end emission visible laser groups in a length direction of the incident surface of the liquid crystal display light guide plate determine a beam projection length w of the laser beams on the lateral light-permeable surface of the liquid crystal display light guide plate, and a relation of the optical length L, the divergence angle $\theta_y$ and the beam projection length w is calculated according to an equation (1):

$$L = \frac{w}{2\tan\frac{\theta_y}{2}}. \quad (1)$$

Further, the end emission visible laser group comprises at least one red laser with a central wavelength being from 600 nm to 700 nm, at least one green laser with a central wavelength being from 500 nm to 550 nm, and at least one blue laser with a central wavelength being from 410 nm to 480 nm; and laser spots of the three lasers are overlapped to form a white laser light source.

Further, the beam shaping device is one of a spherical mirror, an aspherical mirror, a reflecting prism, a beam expanding prism, a micro-optical lens device, a wave lens, a cylindrical mirror, a Fresnel lens, a diffuse reflection device, a fly-eye lens, a scattering device, an optical wedge, an optical grating, a cemented lens, a plane mirror or a curved mirror, or combinations of the above optical devices.

Further, the reflectors comprise a material with a refractive index greater than 1 to form a solid structure in which the visible laser beams are totally reflected; when the reflectors are of a hollow cavity structure, a high-reflectivity material corresponding to a wavelength of the laser beams is present on an inner wall of a hollow cavity; and when the reflectors are plane reflectors, a combination of the solid structure and the hollow cavity structure is used.

Further, reflection surfaces of the reflectors for reflecting laser light are planar surfaces, aspherical surfaces, spherical surfaces, micro-optical structural surfaces, diffuse reflection surfaces or optical grating surfaces; and on the reflection surfaces of the reflectors, the laser beams produce an optical phenomenon such as specular reflection, diffusion reflection or "refraction+reflection".

Further, the emergent and incident surfaces of the liquid crystal display light guide plate and the reflectors have micro-optical structures for correcting the divergence angle of the visible laser beams.

Further, the emergent and incident surfaces of the liquid crystal display light guide plate and the reflectors have a spherical surface, an aspherical surface, a cylindrical surface or a prism for correcting the divergence angle of the laser beams.

Further, thin film optical devices capable of eliminating newton rings and implementing scattering, refraction and light homogenizing are present between incident light-permeable surfaces and emergent light-permeable surfaces of the beam shaping devices, the liquid crystal display light guide plate, the reflectors and the optical devices.

Further, the laser backlight for the edge-lit type liquid crystal display is forcibly cooled by air cooling, water cooling or semiconductor refrigeration.

Further, wires or related electronic components of a liquid crystal display screen wrap or are placed outside the reflectors.

Beneficial effects:

1. In the present invention, the visible laser beams emitted by the multi-primary-color end emission visible lasers in the backlight are propagated for a long distance to overlap on a large area on the side surface of the liquid crystal display light guide plate, so as to eliminate color blocks and bright and dark stripes caused when the visible laser beams at different wavebands are not overlapped in the liquid crystal display light guide plate in an existing technical solution, thereby obtaining the backlight surface light source of the liquid crystal display, which is uniform in light field distribution.

2. In the present invention, the laser beams are turned by 180 degrees by the reflectors, so that the laser beams in the backlight can sufficiently overlap in the liquid crystal display light guide plate without increasing a width/height of a side frame of the liquid crystal display, thereby obtaining a narrow-frame appearance of the whole display to increase a screen-to-body ratio.

3. Under the condition of total light energy meeting an illumination requirement of the liquid crystal display, lengths of light spots of the end emission visible lasers on the incident surface of the liquid crystal display light guide plate are increased, so that output energy of the separate end emission visible laser can be increased, the number of lasers used is reduced without reducing image brightness uniformity of the liquid crystal display, reducing the production cost.

4. The present invention can solve the problems that the end emission visible lasers are fixed and a cooling structure is too large, resulting in a "big jaw" of the liquid crystal display and mounting conflicts between fixing and cooling structures, wires and related electronic devices of the liquid crystal display.

5. The present invention can comprehensively solve the cooling problem of the end emission visible lasers and prolong a service life of the laser liquid crystal display.

Wherein, 1-End emission visible laser group; 101-Blue light semiconductor laser; 102-Green light semiconductor laser; 103-Red light semiconductor laser; 2-Beam shaping device; 201-Aspherical laser collimating lens; 202-Beam expanding concave surface cylindrical lens; 203-Micro-optical beam shaping device; 204-Wave lens; 205-Beam expanding micro-optical lens; 206-Powell lens; 207-Convex-plane cylindrical lens; 208-Plano-concave cylindrical lens; 3-Reflector; 301-Blue light beam combiner; 302-Green light beam combiner; 303-Red light high-reflectivity mirror; 304-Trapezoid prism; 4-Liquid crystal display light guide plate; 41-Scattering region; 5-Liquid crystal display screen;

6-Light homogenizing/diffusing brightness enhancement film group; 7-Liquid crystal display housing; 71-End emission visible laser heat sink; and Arrow lines represent laser beams.

DETAILED DESCRIPTION OF THE EMBODIMENTS

The present disclosure is described below in detail with reference to the accompanying drawings and embodiments.

Figure 1:
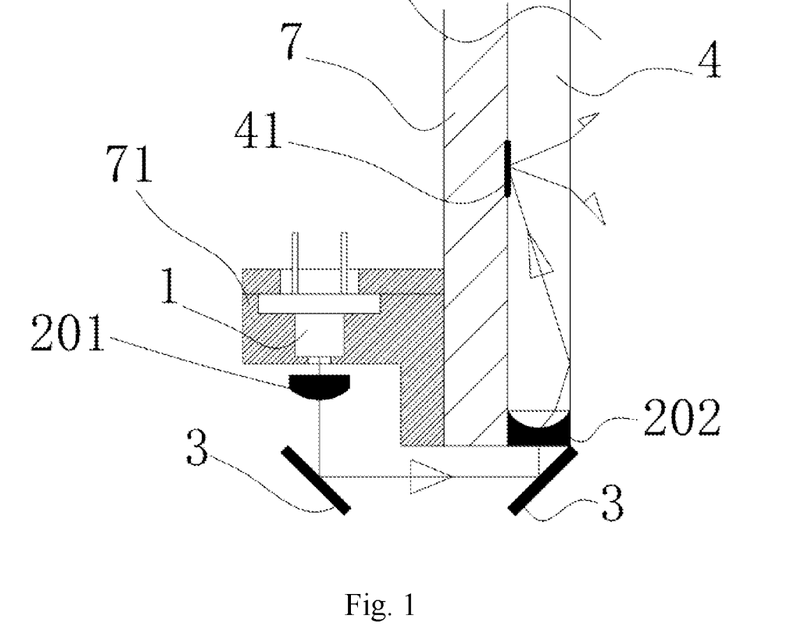
FIG. 1 is a schematic diagram illustrating the structural principles of the present disclosure.

As shown in FIG. 1, the present disclosure provides a laser backlight for an edge-lit type liquid crystal display. A liquid crystal display light guide plate 4 is fixed on an inner side surface of a liquid crystal display housing 7. An end emission visible laser groups 1 are mounted on a heat sink 71. The heat sink 71 is fixed on an outer side surface of the liquid crystal display housing 7 on a back surface of a liquid crystal display light guide plate 4 (a length×width side, close to the liquid crystal display housing 7, of the liquid crystal display light guide plate 4). A spatial distance L is present between the end emission visible laser groups 1 and a lateral light-permeable surface (a length×thickness or width×thickness surface of the liquid crystal display light guide plate 4) of the liquid crystal display light guide plate 4, and L is a shortest optical length by which laser beams emitted by visible end emission semiconductor lasers reach the lateral light-permeable surface of the liquid crystal display light guide plate after passing through necessary optical devices. At least one reflector 3 is present on a position close to the lateral light-permeable surface of the liquid crystal display light guide plate 4. Beam shaping devices 201 and 202 are present between the lateral light-permeable surface of the liquid crystal display light guide plate 4 and the reflector 3 close to the lateral light-permeable surface, wherein the beam shaping device 201 is configured to expand laser beams $\theta_y$, and the beam shaping device 202 is configured to expand laser beams $\theta_x$. The laser beams emitted by the visible end emission semiconductor laser groups 1 first pass through the beam shaping device 201, are reflected by the reflector 3 close to the side surface of the liquid crystal display light guide plate 4, and then are incident on the beam shaping device 202. The laser beams expanded by the beam shaping devices 201 and 202 are incident on the liquid crystal display light guide plate 4 through the lateral light-permeable surface of the liquid crystal display light guide plate 4. The expanded laser beams are incident on the liquid crystal display light guide plate 4 and are then scattered by a scattering region 41 on the liquid crystal display light guide plate 4, to form a uniform surface light source.

Figure 2:
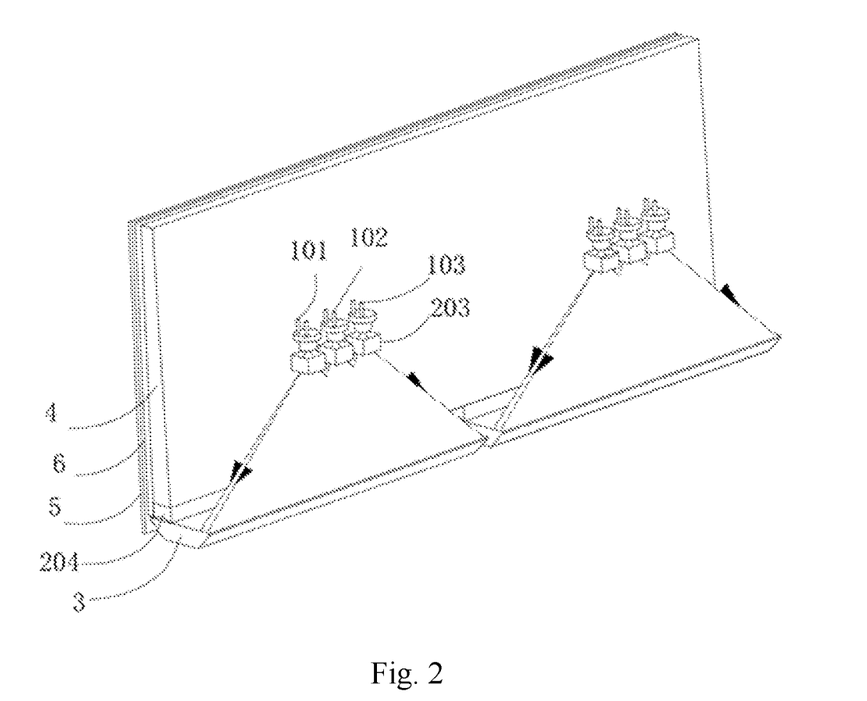
FIG. 2 is a schematic diagram of the present invention applied to a laser liquid crystal display.

As shown in FIG. 2, two end emission visible laser groups 1 form a light source for a 24-inch liquid crystal display. 101-Blue light semiconductor laser; 102-Green light semiconductor laser; 103-Red light semiconductor laser; 203-Micro-optical beam shaping device; 204-Wave lens; 3-PMMA trapezoid reflector; 4-Liquid crystal display light guide plate; 5-Liquid crystal display screen; and 6-Light homogenizing/diffusing brightness enhancement film group.

An end emission visible laser group 1 includes a blue light semiconductor laser 101 with a central wavelength being from 410 nm to 480 nm, a green light semiconductor laser 102 with a central wavelength being from 500 nm to 550 nm, and a red light semiconductor laser 103 with a central wavelength being from 600 nm to 660 nm; and laser spots of the three lasers are overlapped to form a white laser light source.

Two end emission visible laser groups 1 form a light source for a 24-inch liquid crystal display. In the end emission visible laser group 1, distances between light-emitting centers of the blue light semiconductor laser 101, the green light semiconductor laser 102 and the red light semiconductor laser 103 are equally 15 mm. The light-emitting centers of the three end emission visible lasers are placed on a same straight line, and have a same optical length away from the lateral light-permeable surface of the liquid crystal display light guide plate.

An optical length L from the end emission visible laser group 1 to the lateral light-permeable surface of the liquid crystal display light guide plate is 12 cm. Laser beams emitted by the wavelength lasers in the end emission visible laser group 1 are shaped by corresponding micro-optical beam shaping devices 203. Distances from the micro-optical beam shaping devices 203 to light outlets of the end emission visible lasers 101, 102 and 103 are 1.5 mm. The visible laser beams with initial divergence angles $\theta_x$=5-10 degrees and $\theta_y$=35-40 degrees are converted into beams with divergence angles $\theta_x'$=0.2 degree and $\theta_y'$=80 degrees. The shaped laser beams are incident on the PMMA 45-degree isosceles trapezoid reflectors 3 with lengths, widths and heights being 530 mm, 16 mm and 3 mm, are reflected twice by the PMMA trapezoid reflectors 3 and then reach the wave lens 204. The wave lens 204 is placed between the liquid crystal display light guide plate 4 and the PMMA 45-degree isosceles trapezoid reflectors 3, and is arranged close to the PMMA 45-degree isosceles trapezoid reflectors 3 and the lateral light-permeable surface of the liquid crystal display light guide plate 4. The wave lens 204 expands laser beams $\theta_x'$. After beam expansion, $\theta_x'$ is changed from 0.2 degree to 80 degrees, and $\theta_y'$ is kept unchanged.

After the foregoing optical propagation and shaping process, spot projection lengths of the end emission visible lasers 101, 102 and 103 on the lateral light-permeable surface of the liquid crystal display light guide plate 4 are 201 mm.

A light spot overlapping area of the adjacent end emission visible lasers is 93% of respective light spot area. The 24-inch 16:9 liquid crystal display light guide plate is 530 mm long, 290 mm wide and 2 mm thick, a sum of light spot projection lengths of the end emission visible lasers on the lateral light-permeable surface of the liquid crystal display light guide plate 4 is 75%.

Figure 3:
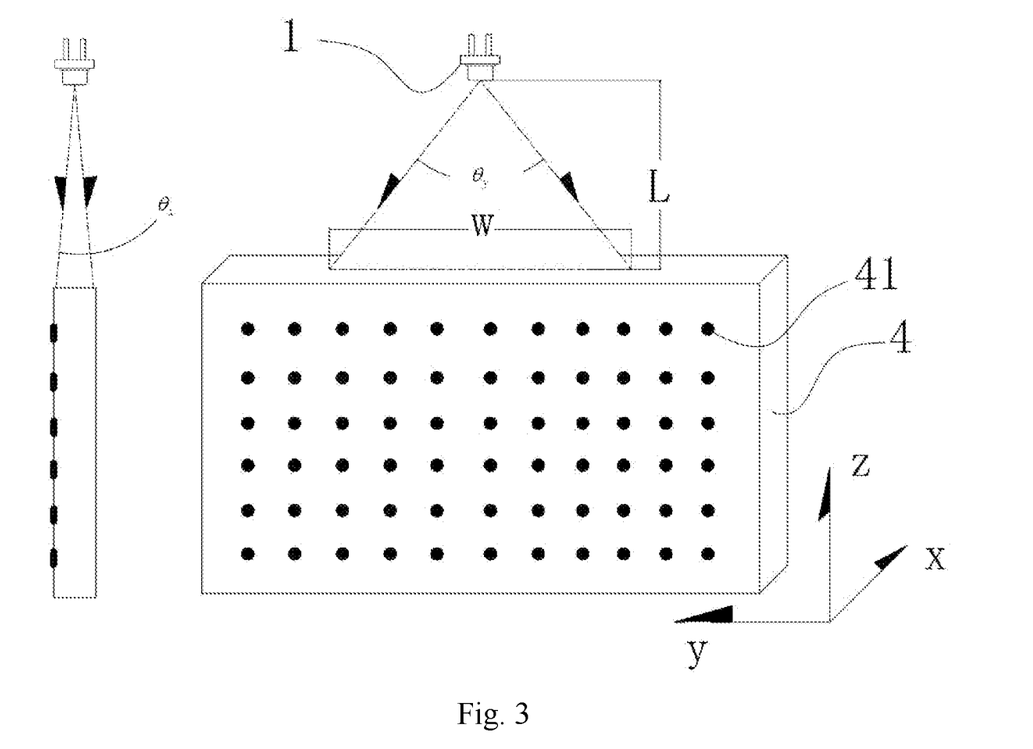
FIG. 3 is a schematic diagram illustrating a divergence angle of a laser beam in length and width directions of an incident surface of a liquid crystal display light guide plate.

As shown in FIG. 3, a spatial distance between the end emission visible laser group 1 and the liquid crystal display light guide plate 4 is related to a divergence angle $\theta_y$ of laser beams emitted by the end emission visible laser group 1 and a beam projection length w that is required by the laser beams on the lateral light-permeable surface of the liquid crystal display light guide plate 4, and the optical length L is calculated according to equation (1):

$$L = \frac{w}{2\tan\frac{\theta_y}{2}} \quad (1)$$

A sum $w_p$ of beam projection lengths $w_1, w_2 \ldots w_n$ (n is a natural number greater than or equal to 1) of a plurality of end emission visible laser groups 1 away from the lateral light-permeable surface of the liquid crystal display light guide plate 4 on the lateral light-permeable surface of the liquid crystal display light guide plate 4 is greater than or equal to W65% (W is a length of the lateral light-permeable surface of the liquid crystal display light guide plate), and $w_p$ is calculated according to an equation (3):

$$w_p = w_1 + w_2 + \ldots + w_n, \quad (2)$$

$$w_n = 2L \times \tan\left(\frac{\theta_{yn}}{2}\right), \text{ and} \quad (3)$$

$$w_p = 2\left(L_1 \times \tan\left(\frac{\theta_{y1}}{2}\right) + L_2 \times \tan\left(\frac{\theta_{y2}}{2}\right) + \ldots L_n \times \tan\left(\frac{\theta_{yn}}{2}\right)\right). \quad (4)$$

A divergence angle $\theta_{xn}$ of laser beams emitted by each end emission visible laser group 1 and a beam projection width $h_n$ that is required by the laser beams in a thickness direction of the lateral light-permeable surface of the liquid crystal display light guide plate 4 are determined by $L_n$ of each end emission visible laser group 1, and $h_n$ is calculated according to an equation (5):

$$h_n = 2L_n \times \tan\left(\frac{\theta_{xn}}{2}\right). \quad (5)$$

Figure 5:
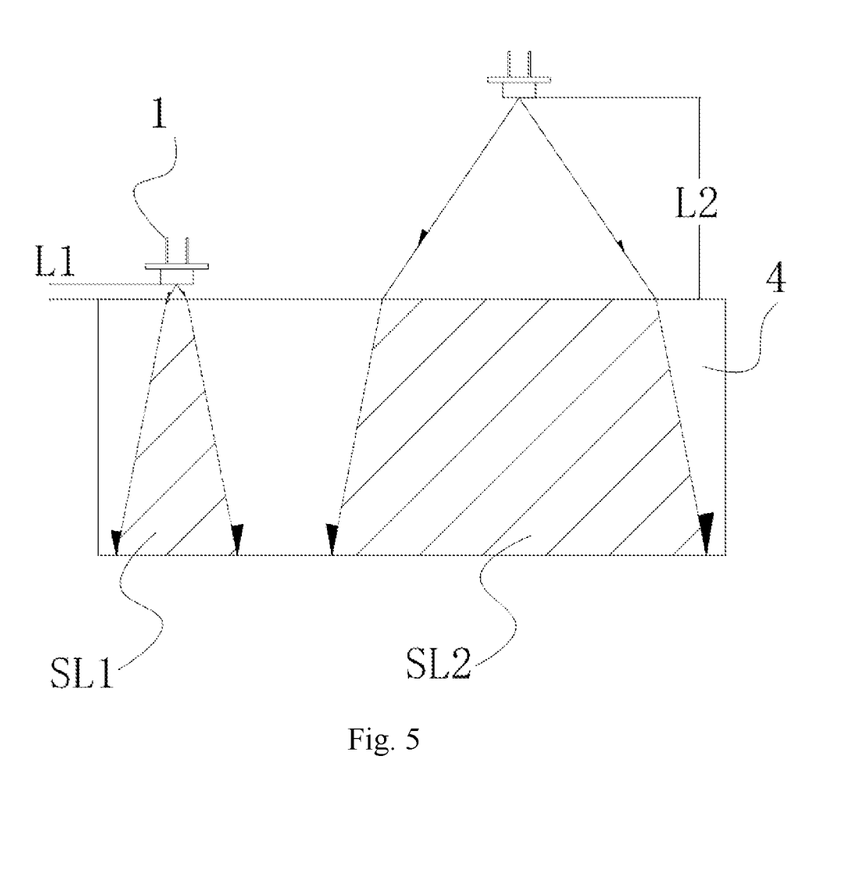
FIG. 5 is a schematic diagram illustrating the coverage area of a laser beam in a liquid crystal display light guide plate.

The visible end emission semiconductor lasers are placed on a back surface of the liquid crystal display housing and then the laser beams are subjected to optical path turning by using the reflectors to be incident on the light guide plate, so that the following effects are realized: firstly, the optical length L between the end emission visible laser groups 1 and the liquid crystal display light guide plate 4 is increased, a coverage area of the specific-divergence-angle laser beams emitted by the visible end emission semiconductor lasers in the liquid crystal display light guide plate 4 is increased (as shown in FIG. 5), that is, a spatial light body of the laser beams in the liquid crystal display light guide plate 4 is enlarged, so as to reduce a spatial light energy density of the laser beams and further reduce/eliminate color blocks and bright and dark stripes caused by an energy distribution difference of the laser beams on the liquid crystal display light guide plate 4, thereby obtaining the liquid crystal display laser backlight surface light source uniform in light field distribution; secondly, under the condition of total light energy meeting an illumination requirement of the liquid crystal display, lengths of light spots of the end emission visible lasers on the incident surface of the liquid crystal display light guide plate are increased, so that a light spot overlapping area between the adjacent end emission visible lasers at different wavebands can be increased, and the larger the overlapping area of laser spots at different wavebands during synthesis of white light from three-primary-color laser beams is, the smaller the color difference of the backlight is, and the more uniform the color temperature is; thirdly, output energy of the separate end emission visible lasers can be increased, and the number of lasers used is reduced; and fourthly, the turned optical path can be used to ensure that a width of a side frame of the liquid crystal display is not increased and ensure that an appearance of the whole liquid crystal display using three-primary-color laser light sources is not affected, so that the optimal optical length L is obtained under these conditions.

Figure 4:
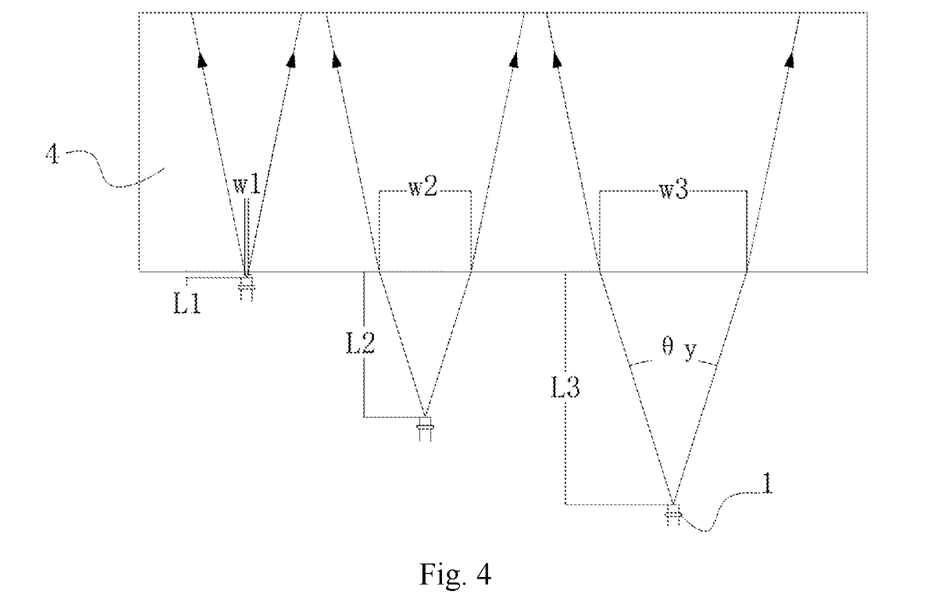
FIG. 4 is a schematic diagram illustrating the relation between a spatial distance from an end emission visible laser to a light-permeable surface of a liquid crystal display light guide plate and a length of a light spot.

As shown in FIG. 4, $L_1$, $L_2$ and $L_3$ are respectively optical lengths from the end emission visible laser groups 1 to the lateral light-permeable surface of the liquid crystal display light guide plate 4, wherein $\theta_y$ is a y-axis divergence angle of the laser beams from the end emission visible laser groups 1, and $w_1$, $w_2$ and $w_3$ are beam projection lengths w of the laser beams on the lateral light-permeable surface of the liquid crystal display light guide plate 4.

A commercially available green light semiconductor laser and a commercially available light guide plate (1540 mm×873 mm×2 mm) of a 70-inch edge-lit type LED liquid crystal display television are taken as an example. A typical value of a fast-axis divergence angle of the green light semiconductor laser is 35 degrees, and a typical value of a slow-axis divergence angle is 5 degrees. An actual measurement value of the coverage area in the lateral light-permeable surface (1540 mm×2 mm) of a backlight LED light bar light guide plate of the 70-inch liquid crystal display television is 81%.

When a sum of light spot lengths of the laser beams emitted by the green light semiconductor lasers on the lateral light-permeable surface of the light guide plate needs to be greater than 1540 mm×0.8, $L_1$=2 mm, $L_2$=12 mm, $L_3$=80 mm, and the divergence angle $\theta_y$ is 35 degrees. In this case, the following can be calculated according to the equation (1) and the equation (3):

$W_1$=1.26 mm, $w_2$=7.56 mm, and $w_3$=50.47 mm.

Therefore, when a distance between the green light semiconductor lasers and the lateral light-permeable surface of the light guide plate is $L_1$, 977.7 end emission visible laser groups 1 are needed; when a distance between the green light semiconductor lasers and the lateral light-permeable surface of the light guide plate is $L_2$, 165 visible end emission semiconductor lasers 1 are needed; when a distance between the green light semiconductor lasers and the lateral light-permeable surface of the light guide plate is $L_3$, 24.41 end emission visible laser groups 1 are needed; and 352 LED light-emitting spots are needed.

Based on a minimum packaged appearance length being 4 mm of the semiconductor lasers, a sum of lengths of the green semiconductor lasers on the side surface of the light guide plate of the 70-inch liquid crystal display television is calculated to be about 4720 mm: when the distance $L_1$ is 3908 mm, the distance $L_2$ is 660 mm and the distance $L_3$ is 96 mm, a total mounting length of the three-primary-color end emission visible lasers needs to be 11724 mm in the case of $L_1$, 1980 mm in the case of $L_2$, and 288 mm in the case of $L_3$. To form a uniform white surface light source, the mounting length $L_1$ far exceeds a side length of the light crystal display light guide plate, and $L_2$ also far exceeds a single side length of the liquid crystal display light guide plate, so that only $L_3$ can meet the requirement of a liquid crystal display light source.

It can be seen from the above three groups of data that, the farther the end emission visible lasers from the liquid crystal display, the lower the light power per unit area of the light guide plate is, the larger the overlapping area of the laser beams is, the better mixing uniformity of the three primary colors is, the better the elimination effect of color difference, speckles and color blocks is, and the better the white light synthesis effect is; the cost is lower as fewer lasers is used; and because fewer lasers are used, the structural design of the backlight for the liquid crystal display is convenient.

Figure 6:
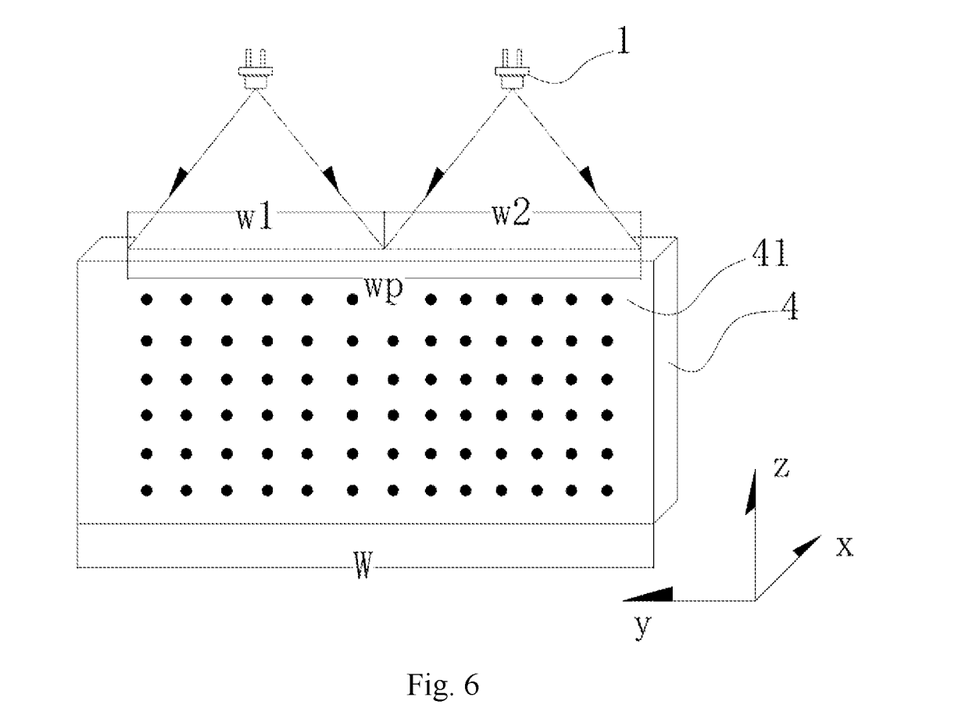
FIG. 6 is a schematic diagram illustrating the relation between the length of a light spot of a semiconductor laser on an incident surface of a liquid crystal display light guide plate and the length of the liquid crystal display light guide plate.
Figure 7:
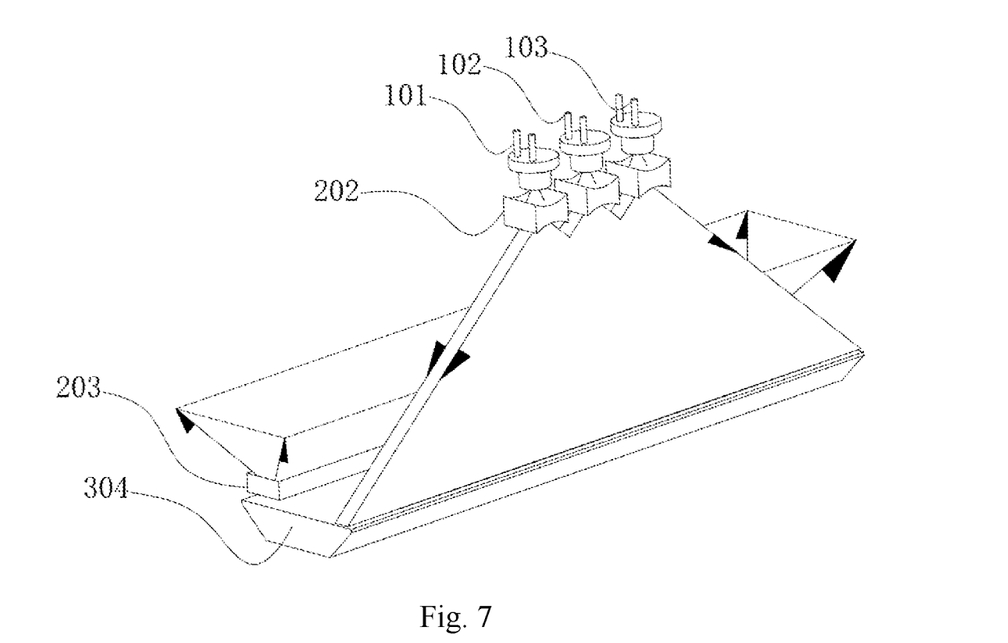
FIG. 7 and FIG. 8 are schematic diagrams illustrating an embodiment of beam shaping devices selected from optical devices.
Figure 8:
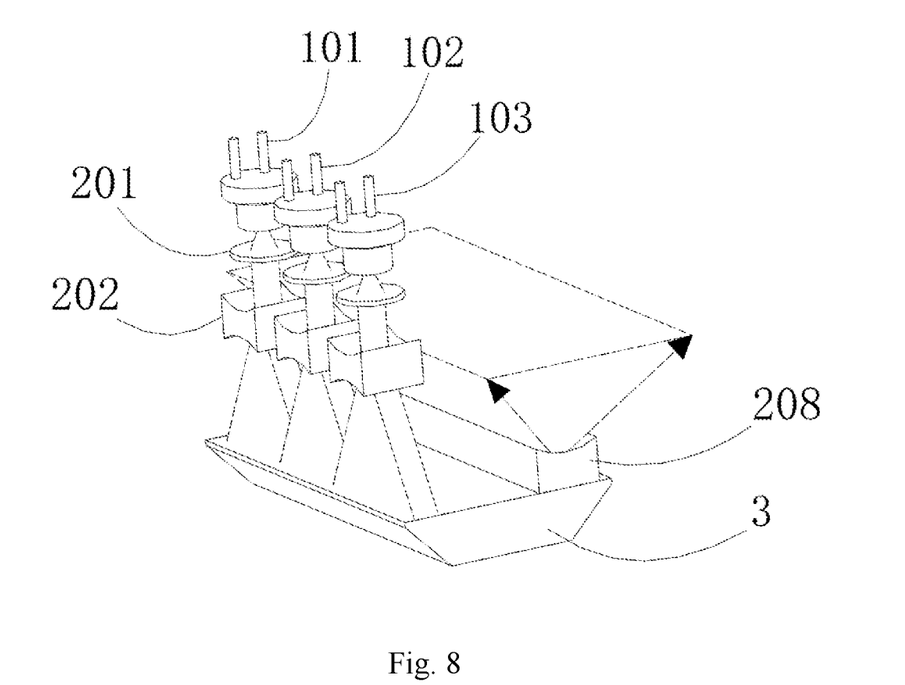

As shown in FIG. 6, $w_1$ and $w_2$ are beam projection lengths of the end emission visible laser groups 1 on the incident surface of the liquid crystal display light guide plate, $w_p$ is a sum of the beam projection lengths, an x axis represents a thickness direction of the liquid crystal display light guide plate, a y axis represents a length direction of the liquid crystal display light guide plate, and a z axis represents a width direction of the liquid crystal display light guide plate. As shown in FIG. 7 and FIG. 8, the beam shaping devices 2 use an aspherical laser collimating lens 201, a Y-axis beam expanding concave surface cylindrical lens 202 and an X-axis beam expanding concave surface cylindrical lens 208. The reflectors 3 are reflector boxes in which aspheric reflectors are arranged.

Figure 9:
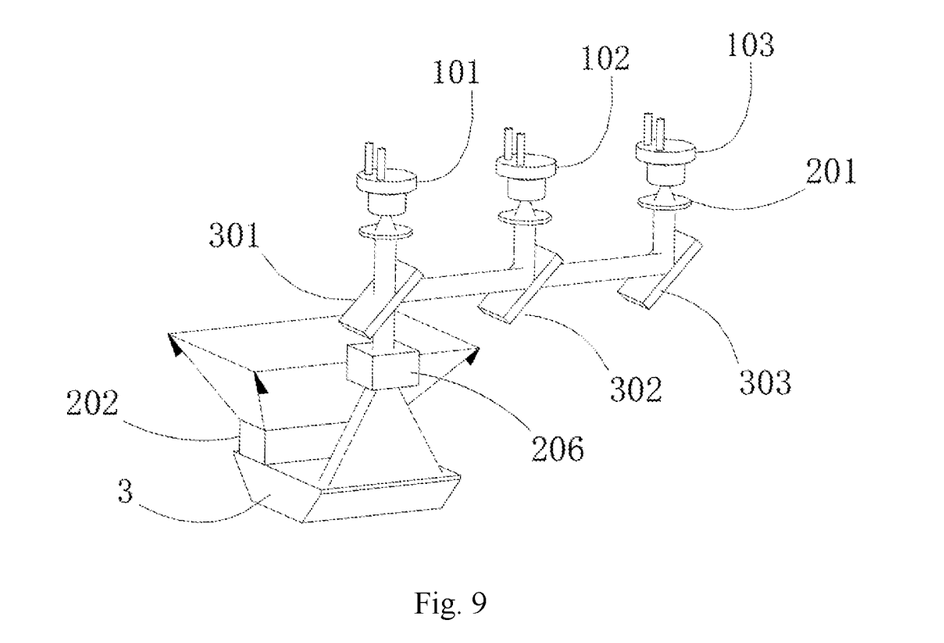
FIG. 9 is a schematic diagram illustrating an embodiment of reflectors selected from optical devices.

As shown in FIG. 9, the reflectors use a blue light beam combiner 301, a green light beam combiner 302 and a red light high reflectivity mirror 303. A fast-axis divergence angle and a slow-axis divergence angle of laser beams emitted by red light semiconductor lasers 103 are collimated by the aspherical laser collimating lens 201 first, and then the collimated red light laser beams irradiate a reflection surface, which is plated with a 600-680 nm 45-degree high-reflectivity film, of the red light high-reflectivity mirror 303, so that the red laser beams irradiate the green light beam combiner 302 after a propagation direction is turned by 90 degrees. The green light beam combiner 32 (one surface of the green light beam combiner is plated with a 600-800 nm 45-degree high-transmittance film, and the other surface is plated with a 500-550 nm 45-degree high-reflectivity film and a 600-880 nm 45-degree high transmittance film) is configured to combine red light and green light. A fast-axis divergence angle and a slow-axis divergence angle of laser beams emitted by green light semiconductor lasers 102 are collimated by a laser beam collimating micro-optical lens, and a propagation direction of the green light laser beams change is turned by 90 degrees after irradiating on the green light beam combiner 302. The combined red light laser beams and the combined green light laser beams irradiate the blue light beam combiner 301. The blue light beam combiner 301 (one surface of the blue light beam combiner is plated with a 400-480 nm 45-degree high-transmittance film, and the other surface is plated with a 600-680 nm 45-degree high-reflectivity film, a 500-550 nm 45-degree high transmittance film and a 400-480 nm 45-degree high-transmittance film) is configured to combine blue light, red light and green light into white light. A fast-axis divergence angle and a slow-axis divergence angle of blue laser beams emitted by blue light semiconductor lasers 101 are collimated by an aspherical laser collimating lens 201, and then the blue light laser beams irradiate to the blue light beam combiner 301. After passing through the blue light beam combiner 301, the red light laser beams, the green light laser beams and the blue light laser beams are combined into white light laser beams. After the white light laser beams are expanded by a Y-axis beam expanding micro-optical lens 206, divergence angles are $\theta_y$ and $\theta_x$. The white light laser beams with divergence angles $\theta_y$ and $\theta_x$ are reflected by a trapezoid prism to turn a propagation direction by 180 degrees and then are incident on the X-axis beam expanding micro-optical lens 202 to be expanded by the X-axis beam expanding micro-optical lens 202 to form laser beams with $\theta_y$=170 degrees and $\theta_x$=120 degrees.

The Y-axis beam expanding concave surface cylindrical lens 202 for laser beams in the embodiment may be replaced with a Powell lens, a wave lens, a diffractive optical device, an optical grating, an aspherical mirror or a spherical mirror. The X-axis beam expanding concave surface cylindrical lens 208 for laser beams may be replaced with a device with an optical beam expanding function such as a diffractive optical device, an optical grating, an aspherical mirror, a spherical mirror, a frosted glass, a light transmittance fiber beam, a light transmittance material particle or a light transmittance scattering thin film.

In conclusion, the foregoing only describes preferable embodiments of the present disclosure, but are not intended to limit the protection scope of the present disclosure. Any modifications, equivalent substitutions and improvements made within the spirit and principle of the present disclosure should fall within the protection scope of the present disclosure.

What is claimed is:

1. A laser backlight for a narrow-frame edge-lit type liquid crystal display, comprising a visible laser group, a beam shaping device, a reflector and a liquid crystal display light guide plate; wherein
the visible laser group is mounted on a back surface of a liquid crystal display housing, a front surface of the liquid crystal display housing is attached to the liquid crystal display light guide plate, the visible laser group has a specific optical length away from a lateral light-permeable surface of the liquid crystal display light guide plate, and after being reflected by the reflector to change a laser propagation direction by 180 degrees, laser beams emitted by visible lasers are incident on the liquid crystal display light guide plate through the light-permeable surface; when being incident on the lateral light-permeable surface of the liquid crystal display light guide plate via the reflector, the visible laser beams emitted by the adjacent visible laser groups generate a light overlap larger than 10% of an area of each light spot, and a sum of lengths of laser spots of the visible laser groups at a same waveband on the lateral light-permeable surface of the liquid crystal display light guide plate is greater than or equal to 0.65 times of the length of the light-permeable surface; the beam shaping devices are present between the visible laser groups and the reflectors and between the reflectors and the lateral light-permeable surface of the liquid crystal display light guide plate; and the beam shaping devices adjust a divergence angle of the visible laser beams.

2. The laser backlight for the narrow-frame edge-lit type liquid crystal display according to claim 1, wherein an optical length L between an optical axis of the visible laser group and a corresponding incident surface of the liquid crystal display light guide plate and a divergence angle $\theta_y$ of the laser beams emitted by the visible laser group in a length direction of the incident surface of the liquid crystal display light guide plate determine a beam projection length w of the laser beams on the lateral light-permeable surface of the liquid crystal display light guide plate, and a relation of the optical length L, the divergence angle $\theta_y$ and the beam projection length w is calculated according to an equation (1):

$$L = \frac{w}{2\tan\frac{\theta_y}{2}}. \quad (1)$$

3. The laser backlight for the narrow-frame edge-lit type liquid crystal display according to claim 2, wherein the visible laser group comprises at least one red laser with a central wavelength being from 600 nm to 700 nm, at least one green laser with a central wavelength being from 500 nm to 550 nm, and at least one blue laser with a central wavelength being from 410 nm to 480 nm; and laser spots of the three lasers are overlapped to form a white laser light source.

4. The laser backlight for the narrow-frame edge-lit type liquid crystal display according to claim 1, wherein the beam shaping device is one of a spherical mirror, an aspherical mirror, a reflecting prism, an expanding prism, a micro-optical lens device, a wave lens, a cylindrical mirror, a Fresnel lens, a diffuse reflection device, a fly-eye lens, a scattering device, an optical wedge, an optical grating, a cemented lens, a plane mirror or a curved mirror, or combinations thereof.

5. The laser backlight for the narrow-frame edge-lit type liquid crystal display according to claim 4, wherein the reflector comprises a material with a refractive index greater than 1 to form a solid structure in which the visible laser beams are totally reflected; when the reflector is of a hollow cavity structure, a high-reflectivity material corresponding to a wavelength of the laser beams is present on an inner wall of a hollow cavity; and when the reflector is plane reflector, a combination of the solid structure and the hollow cavity structure is used.

6. The laser backlight for the narrow-frame edge-lit type liquid crystal display according to claim 5, wherein a reflection surface of the reflector for reflecting laser beam is a planar surface, an aspherical surface, a spherical surface, a micro-optical structural surface, a diffuse reflection surface or an optical grating surface; and on the reflection surface of the reflector, the laser beams have an optical phenomenon such as specular reflection, diffusion reflection or "refraction+reflection".

7. The laser backlight for the narrow-frame edge-lit type liquid crystal display according to claim 6, wherein emergent and incident surfaces of the liquid crystal display light guide plate and the reflector have micro-optical structures for correcting the divergence angle of the visible laser beams.

8. The laser backlight for the narrow-frame edge-lit type liquid crystal display according to claim 7, wherein the emergent and incident surfaces of the liquid crystal display light guide plate and the reflector have a spherical surface, an aspherical surface, a cylindrical surface or a prism for correcting the divergence angle of the laser beams.

9. The laser backlight for the narrow-frame edge-lit type liquid crystal display according to claim 8, wherein thin film optical devices capable of eliminating newton rings and implementing scattering, refraction and light homogenizing are present between incident light-permeable surfaces and emergent light-permeable surfaces of the beam shaping devices, the liquid crystal display light guide plate, the reflector and the thin film optical devices.

10. The laser backlight for the narrow-frame edge-lit type liquid crystal display according to claim 9, wherein the laser backlight for the edge-lit type liquid crystal display is forcibly cooled by air cooling, water cooling or semiconductor refrigeration; and wires or related electronic components of the liquid crystal display wrap or are placed outside the reflectors.

* * * * *